J. SCALCO.
AUXILIARY AIR FEED FOR EXPLOSIVE ENGINES.
APPLICATION FILED JUNE 22, 1920.
1,420,288.
Patented June 20, 1922.
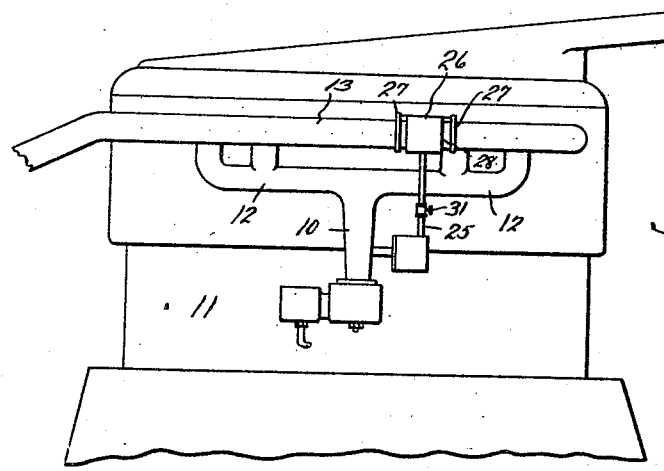
Fig. 1
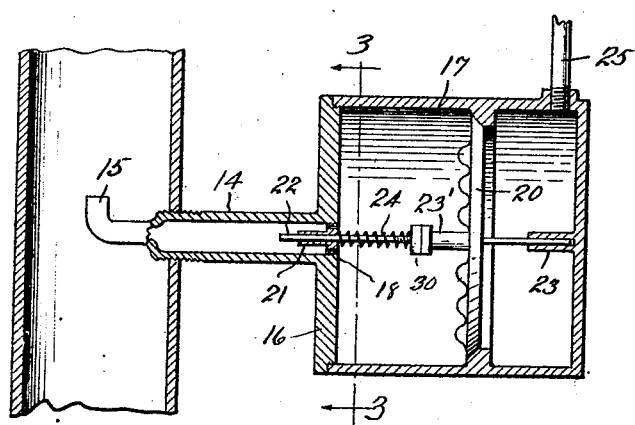
Fig. 2
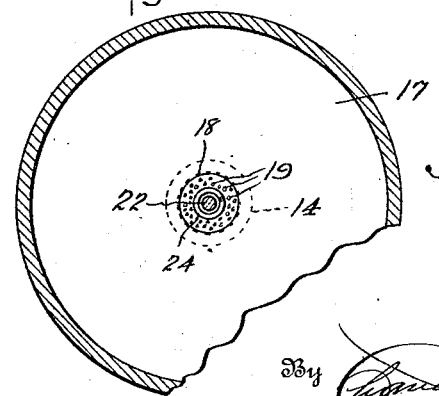
Fig. 3
Inventor
Joseph Scalco
Attorney

UNITED STATES PATENT OFFICE.

JOSEPH SCALCO, OF CROWLEY, LOUISIANA.

AUXILIARY AIR FEED FOR EXPLOSIVE ENGINES.

1,420,288. Specification of Letters Patent. Patented June 20, 1922.

Application filed June 22, 1920. Serial No. 390,873.

*To all whom it may concern:*

Be it known that I, JOSEPH SCALCO, a citizen of the United States, residing at Crowley, in the parish of Acadia, State of Louisiana, have invented certain new and useful Improvements in Auxiliary Air Feeds for Explosive Engines; and I do hereby declare the following to be a full, clear, and exact description of the invention, such as will enable others skilled in the art to which it appertains to make and use the same.

This invention relates to new and useful improvements in attachments for automobiles and particularly to attachments to the engines thereof.

One object of the invention is to provide a novel and improved means for attachment to the intake manifold of the engine for delivering an auxiliary supply of air with the gas and thereby economize on the use of gas.

Another object is to provide a novel and improved means whereby preheated air is delivered into the intake manifold with the gas.

A further object is to provide a novel and improved air feeding means of the character mentioned, wherein the air is broken up or divided into minute particles before entering the manifold, whereby the air will be more intimately mixed with the charge of gas as it passes to the cylinder.

A still further object is to provide a novel and improved air valve of such construction that the suction in the manifold will more properly and quickly open the same when the air is to be permitted to enter the manifold.

Other objects and advantages will be apparent from the following description when taken in connection with the accompanying drawing.

In the drawing:

Figure 1 is an elevation of a portion of an automobile engine showing the invention in position on the intake manifold.

Figure 2 is an enlarged vertical longitudinal sectional view through the attachment and a portion of the intake manifold of the engine to show the air nozzle within the manifold.

Figure 3 is a vertical transverse sectional view through the attachment, taken on the line 3—3 of Figure 2.

Referring particularly to the accompanying drawing, 10 represents the vertical leg of the intake manifold of the engine 11, and 12 the branches of the manifold, while 13 represents the exhaust manifold of the engine.

Disposed through one wall of the vertical leg 10 is a pipe 14, the end within the leg being reduced and turned upwardly, as shown at 15, to form a discharge nozzle for the air. The outer end of the pipe 14 is connected to the center of a disk 16, which is externally threaded for engagement in the adjacent end of the cylindrical air chamber 17. Within the said outer end of the pipe 15 there is mounted a disk 18 formed with a plurality of very small perforations 19, which serve to break up the air into very fine particles as it passes into the manifold, thus insuring a more thorough and intimate mixture of the air with the gas.

In the other end of the cylinder 17 is formed an internally arranged valve seat against which the valve 20 is arranged to engage. In the center of the disk 16 is mounted a small cylindrical guide 21 through which the adjacent end of the stem 22 of the valve 20 is slidably disposed. In the other end of the air chamber there is mounted a similar guide 23 for the slidable reception of the adjacent end of the beforementioned valve stem 22. A shoulder 23' is formed on the first-named end portion of the stem 22, and encircling the stem, and bearing with its ends against said shoulder and the perforated disk 16, is a coil spring 24, which normally and yieldably holds the valve against its seat.

Connected to one side of the air chamber, outwardly of the valve seat, is an air conducting pipe 25 which leads to and is connected with a hot air box or chamber 26, secured on the exhaust manifold 13. The chamber 26 is secured on the upper side of the manifold 13 by means of the clamps 27, and an opening 28 for the entry of outside air thereinto, this air being heated within the chamber and then passing through the pipe 25 to the air chamber 17, from whence it is sucked into the intake manifold by the suction of the gas passing to the cylinders.

The spring 24 is adjustable, in its tension, by means of a nut 30, engaged on the stem 22, between the spring and the shoulder 23', whereby the valve can be regulated to open under the influence of different degrees of suction in the intake manifold. By this means the valve can be regulated to open while the automobile is running at a predetermined number of miles per hour.

In the pipe 25 there is disposed a hand valve 31 by means of which the supply of air to the chamber 17 can be regulated or completely cut off.

What is claimed is:

In combination with an intake manifold of an explosive engine, an auxiliary air feeding device comprising a pipe having its inner end extending through the wall of said manifold and secured therein, a disk or flange secured to the outer end of said pipe and having its outer edge threaded, a cylindrical air chamber threaded to engage the threads of said disk or flange and having an air inlet in one side, an internal annular flange within said air chamber shaped to form a tapered valve seat, an inwardly opening valve to fit said seat, stems extending inwardly and outwardly from the faces of said valve, a perforated disk mounted within the outer end of said pipe, tubular concentric projections extending from said perforated disk and from the inside wall of said air chamber respectively, to form guides for said valve stems, an adjusting nut engaging on said inwardly projecting valve stem, and a helical spring encircling said stem between said perforated disk and said adjusting nut, for the purpose described.

In testimony whereof, I affix my signature, in the presence of two witnesses.

JOSEPH SCALCO.

Witnesses:
FLOY OGDEN,
E. A. SHREVE.